United States Patent
Neumann

(10) Patent No.: US 6,925,854 B2
(45) Date of Patent: Aug. 9, 2005

(54) METHOD AND DEVICE TO CHECK THE BEARING GAP OF A HYDRODYNAMIC BEARING

(75) Inventor: Rudolf Neumann, Spaichingen (DE)

(73) Assignee: Minebea Co., Inc., Nagano (JP)

( * ) Notice: Subject to any disclaimer, the term of this patent is extended or adjusted under 35 U.S.C. 154(b) by 0 days.

(21) Appl. No.: 10/756,675

(22) Filed: Jan. 13, 2004

(65) Prior Publication Data

US 2004/0206159 A1 Oct. 21, 2004

(30) Foreign Application Priority Data

Jan. 13, 2003 (DE) .......................................... 103 01 429

(51) Int. Cl.⁷ .................................................. G01M 3/02
(52) U.S. Cl. .......................................... 73/37; 73/37.5
(58) Field of Search ........................ 73/37, 37.5; 310/90

(56) References Cited

U.S. PATENT DOCUMENTS

| | | |
|---|---|---|
| 3,683,673 A | 8/1972 | Eichler et al. |
| 5,203,204 A * | 4/1993 | Miyazaki et al. .......... 73/118.1 |
| 6,119,348 A * | 9/2000 | Jennings et al. ......... 29/898.09 |
| 6,142,672 A * | 11/2000 | Bently et al. ................ 384/118 |
| 6,530,143 B1 * | 3/2003 | Jennings et al. ............... 29/721 |
| 2003/0091249 A1 * | 5/2003 | Kurimura et al. ........... 384/100 |

FOREIGN PATENT DOCUMENTS

| | | | |
|---|---|---|---|
| AT | 005 225 U1 | 4/2002 | |
| DE | 37 13 358 A1 | 2/1988 | |
| JP | 56168110 A * | 12/1981 | ........... G01B/21/02 |
| JP | 06137997 | 5/1994 | |

* cited by examiner

*Primary Examiner*—Hezron Williams
*Assistant Examiner*—Rodney Frank
(74) *Attorney, Agent, or Firm*—Joel E. Lutzker, Esq.; Anna Vishev, Esq.; Schulte Roth & Zabel LLP

(57) ABSTRACT

A method of verifying and inspecting the bearing gap between a shaft and a shaft seat of a hydrodynamic bearing includes positioning the shaft in its functional position in the shaft seat of the test bearing. A measuring fluid is then caused to flow through the bearing gap. One or more parameters characterizing the fluid flow through the bearing gap can then be measured. Because these parameters of the fluid flow are affected by the dimensions of the bearing gap, the bearing gap can thus be reliably verified. A corresponding device for verifying and inspecting the bearing gap is also provided.

24 Claims, 3 Drawing Sheets

METHOD AND DEVICE TO CHECK THE BEARING GAP OF A HYDRODYNAMIC BEARING

CROSS-REFERENCE TO RELATED APPLICATIONS

This application claims all rights of priority to German Application Serial No. 103 01 429.2 filed Jan. 13, 2003 (pending).

BACKGROUND OF THE INVENTION

The invention relates to a method and a device for verifying the dimension of the bearing gap between a shaft and a shaft seat of a hydrodynamic bearing.

Hydrodynamic bearings are used, for example, as rotary bearings of spindle motors for hard disk drives. Alongside their great robustness and high shock resistance, such motors have high running smoothness and running precision. In manufacturing a hydrodynamic bearing, however, it is important that very tight tolerances are maintained for the bearing gap between the shaft and the shaft seat. Since the gap width is particularly significant for the build up of hydrodynamic pressure in a lubricant within the bearing gap and thus the bearing width is significant for the functional reliability of the bearing or the motor, it is of utmost importance to inspect and verify the dimension of the bearing gap before the final assembly of the bearing.

SUMMARY OF THE INVENTION

In accordance with the invention, a method and a device are provided by means of which the bearing gap can be reliably verified.

In accordance with the present invention, for a test bearing, the shaft is positioned in the shaft seat in its functional position, a measuring fluid is made to flow through the bearing gap and one or more parameters characterizing the fluid through-flow through the bearing gap are measured.

The method provided by the present invention allows the mean hydraulic diameter of the bearing gap and, in particular, the gap width to be determined before the final assembly of the hydrodynamic bearing. Since the shaft is positioned in its functional position in the shaft seat, the bearing parameters relevant to the operability of the hydrodynamic bearing are determined. Specifically, the bearing parameters relevant to the build up of hydrodynamic pressure are determined using the presently provided method and apparatus. This means that the test bearing is checked in its functional assembly configuration before final assembly. This allows the reliable characterization and thus classification of the test bearing that can then be applied to the completed bearing.

The method presented in the invention can be carried out easily and quickly. Consequently, a large number of test bearings can be non-destructively tested within a short period of time. Therefore, the method in accordance with the invention is particularly suited for classifying pre-assembled bearings to allow assigning them, for example, to a specific tolerance category. The inspection or verification of the bearing gap in accordance with the invention takes place before the hydrodynamic bearing is finally assembled so that the measuring fluid can still flow through the bearing gap. In particular, the inspection or verification is performed before filling lubricant into the bearing. If the inspected bearing gap is too small or too large, the shaft can be removed from the shaft seat. Then, after being measured accordingly, suitable substitute shafts can be placed in the appropriate shaft seats. In this way, the percentage of rejects can be greatly reduced.

It is particularly beneficial when a gaseous measuring fluid is used as a medium for the gap verification, whereby appropriate ancillary conditions are created which bring about a forced flow of measuring fluid through the bearing gap. This allows bearing gaps with very small gap widths, for example in the $\mu$m range, to be inspected and verified achieving a high accuracy. For example, for typical gap widths of 3 $\mu$m, tolerance deviations in the region of ±0.5 $\mu$m can be detected.

Furthermore, it is beneficial if the measuring fluid flows through the bearing gap in a main direction of flow which is essentially parallel to the longitudinal axis of the shaft. This enables the mean hydraulic diameter and the width of the bearing gap to be easily determined, for example, by measuring a difference in pressure.

It is particularly beneficial if the measuring fluid is admitted to the test bearing in such a way that a non-turbulent state of flow is created when the fluid flows through the bearing gap. Turbulent flows are always linked to pressure losses which could affect the measuring result accordingly. If care is taken that a quasi-stationary laminar flow is created in the bearing gap, then, by measuring a difference in pressure, the bearing gap of the measured test bearing can be verified with great accuracy.

The test bearing is open at both ends of the shaft seat so that a forced through-flow of measuring fluid can be established, whereby the measuring fluid is forced into the test bearing from one end.

Using the provided method, it is possible to measure the volume flow rate flowing through the bearing gap from one end of the test bearing to the other end. A highly accurate measurement can be obtained if the measuring fluid has a specific start pressure.

A parameter which determines the flow of measuring fluid through the bearing gap, is the difference in pressure between a defined start pressure and a pressure generated by the flow resistance during the through-flow of fluid through the bearing gap.

The difference in pressure in relation to the start pressure is then a parameter which characterizes the fluid flow through the bearing gap. By measuring this pressure difference, the mean hydraulic gap diameter can be determined.

Such a pressure difference measurement can be performed in an easy way if, for example, after a pressure reducer which generates a specific start pressure, a pressure sensor is positioned which in turn is operatively connected to the measuring fluid admission region of the bearing gap. The pressure difference in relation to the start pressure is then directly related to the fluid flow through the bearing gap.

Here, in particular, the pressure measurement takes place before an injection area of the measuring fluid to the bearing relative to the flow direction of the measuring fluid. In this way, the pressure can be easily and accurately measured, whereby the difference between the start pressure and the resulting pressure is a measure of the through-flow of fluid through the bearing gap.

Once a test bearing has been measured, it can be classified according to the result and, in particular, it can be assigned to one of different manufacturing tolerances categories.

In particular, the measurement result used to classify a bearing is only taken after quasi-stationary conditions have been achieved, that is when stable flow conditions have been established in the gap, which means when the pressure difference, which can be determined by the pressure sensor, no longer changes.

Further, in accordance with the present invention, a device to check the bearing gap between the shaft and the shaft seat of a test bearing of a hydrodynamic bearing is provided, the device having an admission device to admit a measuring fluid to the bearing gap and a measuring device to measure at least one parameter which characterizes the fluid through-flow through the gap.

This device has the advantages mentioned above with respect to the method presented in accordance with the invention.

Further beneficial embodiments have also been described earlier with respect to the device and the method presented in accordance with the invention.

In particular, a pressure reducer is provided by means of which a defined start pressure can be set. This enables stable, reproducible starting conditions to be created so that by measuring the pressure difference, the mean hydraulic diameter of the gap between the shaft and the shaft seat, in particular, can be easily and quickly determined.

If the measuring device includes one or more pressure sensors, wherein a pressure sensor is preferably positioned before the test bearing, a measurement can be easily and quickly obtained. If a gaseous measuring fluid with a defined start pressure is fed to the bearing gap, a loss of pressure occurs as it flows through the gap. The magnitude of this loss of pressure depends on the hydraulic diameter of the bearing gap. The pressure sensor allows a pressure difference compared to the start pressure to be measured, thus determining the hydraulic diameter of the bearing gap which defines this pressure difference.

The pressure can be measured with great accuracy which means the mean hydraulic diameter of the gap can also be determined with great accuracy.

A measurement can be easily performed if the admission device includes a feeding device through which measuring fluid can be admitted to the bearing gap from one end, whereby the bearing gap can be sealed off from the outside area by means of the feeding device. An injection region is provided via the feeding device to force the measuring fluid into the bearing gap, whereby the feeding device then ensures that no bypass is created through which the measuring fluid can escape, so that any change in pressure in relation to the start pressure of the measuring fluid can only be caused by the flow resistance of the fluid flowing through the bearing gap. In this way, the hydraulic gap diameter can be simply and accurately measured using the flow of measuring fluid through the bearing gap.

A holding device is beneficially provided for positioning the shaft in the shaft seat in its functional position. The functional position is a position that the shaft adopts when finally assembled. This is also why it is useful to check the test bearing in this condition. The holding device ensures that the shaft is not displaced from of its functional position through measuring fluid being admitted to the test bearing.

Since the measuring fluid exerts a force on the shaft in the direction of flow, in one embodiment, a contact element (stop element) is provided by means of which any movement of the shaft in the flow direction can be blocked. The shaft rests against the contact element at least when the measuring fluid is flowing through the bearing gap. This means that, at least during the flow of measuring fluid, the shaft is fixed in a defined position also in relation to its longitudinal position.

In an alternative embodiment, the holding device includes a force exerting device by means of which a force can be exerted on the shaft in the opposite direction to the flow direction of the measuring fluid. The force exerting device allows the shaft to be pressed against an attachment face of the shaft seat and, in particular, allows a thrust plate of the shaft to be pressed against the attachment face. This means that via the force exerting device, a force can be exerted which is greater than the lift force of the measuring fluid on the shaft in the flow direction. Such a holding device can be beneficially deployed when a shaft thrust plate is provided with re-circulation holes for lubricant. Measuring fluid can then flow through the test bearing via such re-circulation holes.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE INVENTION

Figure 2:
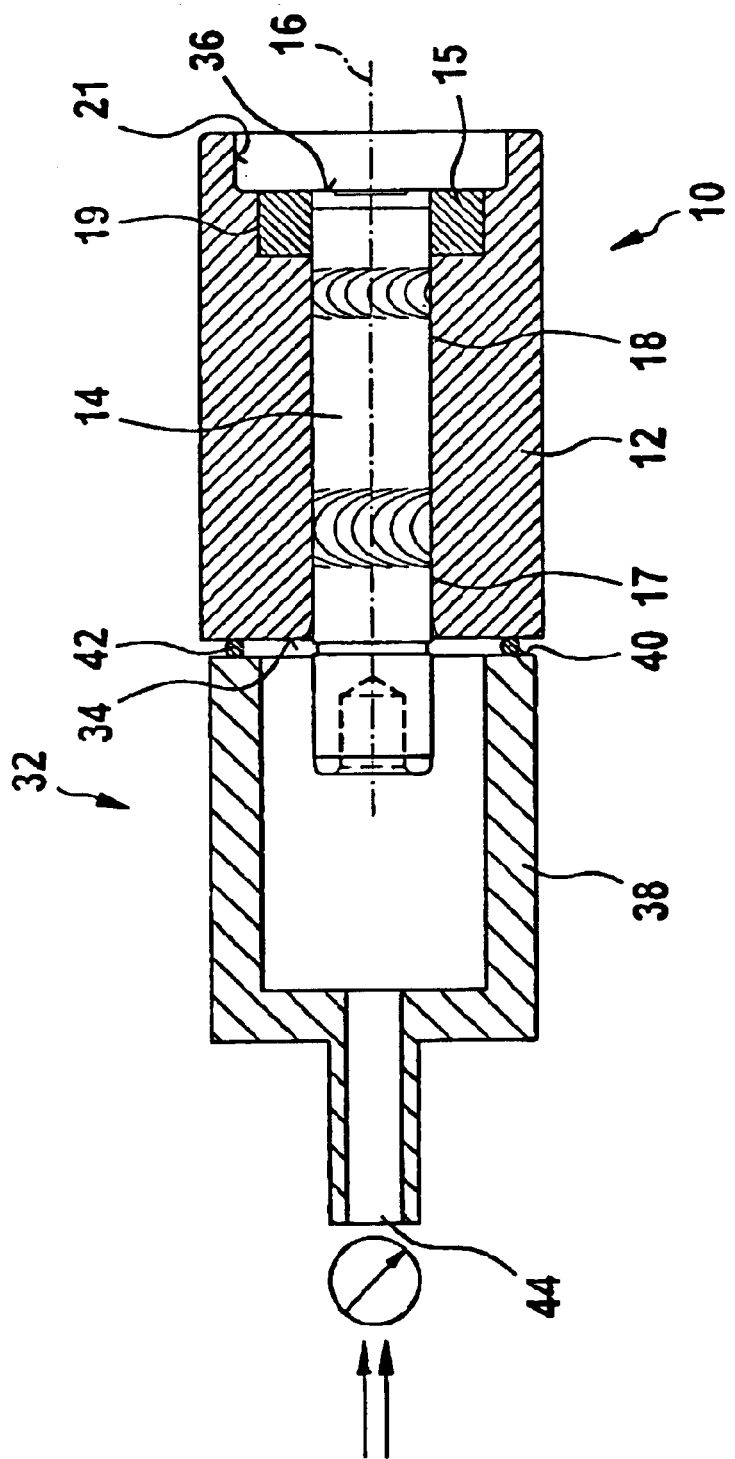
FIG. 2 is a schematic cross-sectional view of a hydrodynamic bearing before final assembly, wherein the bearing is coupled to the device according to FIG. 1, and the shaft is positioned in a shaft seat in its functional position.

A hydrodynamic bearing is schematically shown in FIG. 2 as a test bearing in a stage before final assembly and is designated there in its entirety by reference numeral 10. Test bearing 10 includes a shaft seat 12 in which a shaft 14 is rotatably arranged. The shaft 14 extends in a longitudinal direction 16.

At one end of the shaft 14, a thrust plate 15 is arranged whose outer diameter is larger than the diameter of the shaft 14. The shaft seat 12 has a first cylindrical seat area 17 in which a section of the shaft 14 is positioned and, together with the corresponding section of the shaft seat 12, forms a radial bearing. A second cylindrical seat area 19 is located adjacently to the first seat area 17. Thrust plate 15 is positioned within the second cylindrical seat area 19.

On final assembly, the hydrodynamic bearing is provided with a counter plate (not shown in the drawing) which encloses the shaft seat 12 at one end. In the embodiment shown in FIG. 2, a cylindrical recess 21 is provided located adjacently to the second seat area 19 of the shaft seat 12. Counter plate can be inserted into the cylindrical recess 21.

A bearing gap 18, substantially annular in cross-section, is formed between the shaft seat 12 and the shaft 14, when the shaft 14 is in place. A typical gap width for hydrodynamic bearings, used, for example, for the rotary bearing of smallscale motors for hard disk drives, is about 3 μm, wherein tolerances in the order of ±0.5 μm are permitted. In a completed bearing, a lubricant is located in the bearing gap 18.

Due to these tight tolerances, a hydrodynamic bearing can only be classified before final assembly when the shaft 14 is positioned in the shaft seat 12 in its functional position, since the frictional losses within the lubricant in the bearing gap 18 are largely determined by the gap design and in particular the gap width.

In accordance with the present invention, in order to verify (inspect) and classify hydrodynamic bearings, the test bearing 10, with the shaft 14 placed in its functional position within the shaft seat 12, is exposed to a gaseous measuring fluid, such as air, and the through-flow-related parameters of the fluid flowing through the bearing gap 18 of the test bearing 10 are determined. Such testing is performed before final assembly of the bearing and, in particular, before the counter plate is mounted and the lubricant is injected into the bearing gap 18.

Figure 1:
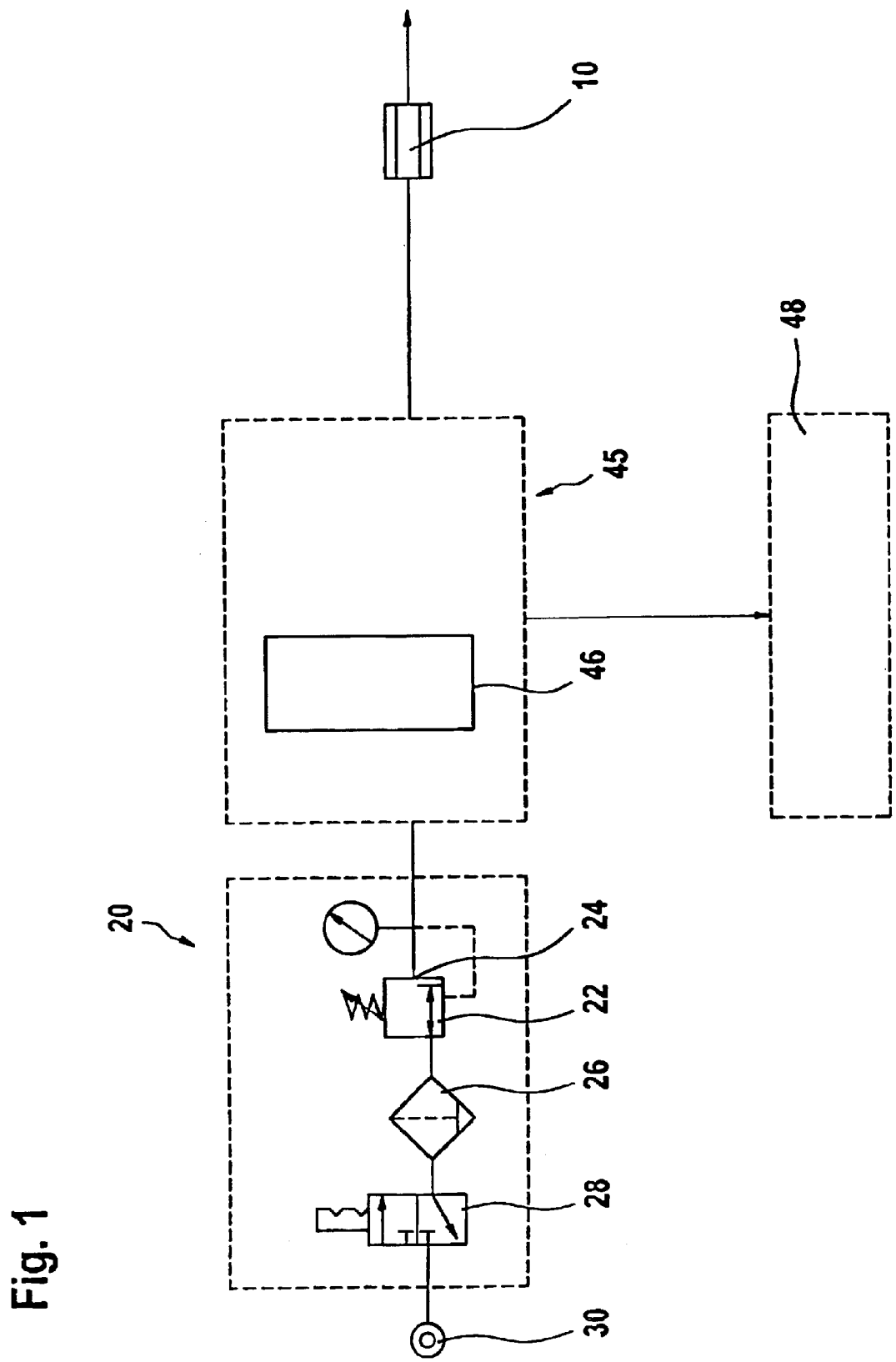
FIG. 1 is a block-diagram of an embodiment of a device in accordance with the invention.

For this purpose, as shown in FIG. 1, an admission device, designated in its entirety by reference numeral 20, is provided for admission of a gaseous measuring fluid to the test bearing 10. In the embodiment illustrated, the admission device includes a pressure reducer 22, via which a defined start pressure of the gaseous measuring fluid which flows through the bearing gap 18, can be set. An outlet 24 of the pressure reducer 22 is operatively connected to the bearing gap 18 so that a stream of measuring gas with a defined start pressure, adjusted by means of the pressure reducer 22, can be fed to the bearing gap. When air is used as the measuring fluid, a typical pressure range for the start pressure is 2 bar to 3 bar.

A filter/water separator 26 is positioned before the pressure reducer 22. The filter/water separator 26 filters out contaminants from the measuring fluid. When air is used as the measuring fluid, water droplets can also be removed by the filter/water separator. Therefore, essentially pure, dry air is preferably used as a measuring fluid in measuring the test bearing 10.

Using a controllable valve 28, the admission device 20 can be operatively (as to fluid flow) coupled or uncoupled to a source 30 of the measuring fluid. In the embodiment illustrated in FIG. 1, the valve 28 is a lever-operated 2/2 valve.

In using air as the measuring fluid, the source 30 could, for example, be the surrounding air, whereby an air compressor sucks in the air and makes it available to or feeds it to the admission device 20.

As shown in FIG. 2, the measuring fluid is fed via a feeding device 32 to the bearing gap 18 of the test bearing 10. For this purpose, the test bearing 10 is open at both ends 34, 36 of the shaft seat 12, so that the measuring fluid can flow from one end 34 through the bearing gap 18 to the other end 36. The feeding device 32 is coupled to the end 34. The thrust plate 15 is arranged in the region of the other end 36, without the counter plate being assembled allowing fluid to flow freely through the bearing gap 18.

The feeding device 32 is provided with a hood 38 which can be attached to the end 34 of the test bearing 10. A seal 42, for example, in the form of an O-ring seal is positioned between the end face 40 of the hood 38 and the shaft seat 12. This seal 42 encloses the bearing gap 18 and ensures that the measuring fluid from the feeding device 32 can only discharge through the bearing gap 18. In particular, the seal 42 is positioned at the end face 40 of the hood 38 so that when the hood 38 is placed against the shaft seat 12, suitable sealing is ensured.

An inlet 44 of the feeding device 32 is operatively (as to fluid flow) connected to the outlet 24 of the pressure reducer 22 so that measuring fluid, which has a defined start pressure, can be provided to the feeding device 32.

By measuring one or more parameters which characterize the through-flow of measuring fluid through the bearing gap 18, the bearing gap 18 itself can be characterized since the narrowest part of the system with through-flow determines the flow parameters. For instance, the hydraulic volume of the bearing gap 18 can be determined. Since the overall dimension of the shaft seat 12 in the longitudinal direction 16 of the shaft 14 is known with great precision, a mean hydraulic diameter of the bearing gap 18 can be derived from the hydraulic volume, and the gap width can in turn be determined. It is then easy to establish whether the test bearing 10 conforms to the specified manufacturing tolerances or not. An end-mounted hydrodynamic bearing can thus be classified according to its manufacturing quality.

In accordance with the invention, it is possible to determine the quantity of the measuring fluid passing through the bearing gap 18.

In the embodiment illustrated in the figures, provision is made to measure the pressure loss of the measuring fluid due to its through-flow through the gap 18. For this purpose, the pressure reducer 22 provides a defined start pressure.

A pressure sensor 46 of a measuring device 45, positioned after the pressure reducer 22 and before the test bearing 10, measures the pressure applied at the feeding device 32. Due to the flow resistance incurred in the through-flow of measuring fluid through the bearing gap 10, this pressure is reduced in relation to the start pressure of the pressure reducer 22, whereby, for an embodiment in which the defined start pressure is in the order of magnitude of 2 to 3 bar, the typical pressure difference (pressure reduction) is in the order of magnitude between 0.7 bar and 1.4 bar.

The result of the measurement, in other words the pressure difference which characterizes the test bearing 10, is shown on a display unit 48.

The pressure sensor 46 can be in connection with a control unit which controls the production process of hydrodynamic bearings and, for example, monitors and records the production steps for each individual bearing. Thus, for example, the measurement result can be directly used to assign an identification to the measured test bearing 10 and to store this identification which characterizes the measured mean hydraulic diameter of the bearing gap 18 of the test bearing 10.

The pressure sensor 46 includes, for example, a pneumatic/electric piezo transducer by means of which the effective pressure is converted into an electric signal which can then be preferably read on the display unit 48.

Figure 3:
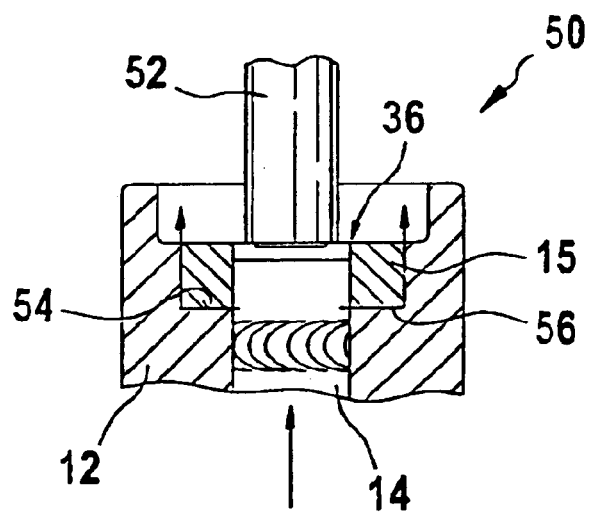
FIG. 3 is a partial view of a first embodiment of the holding device.
Figure 4:
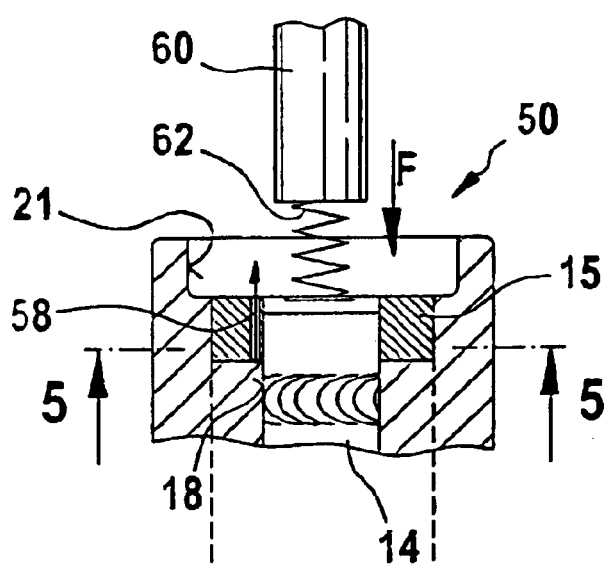
FIG. 4 is a partial view of a second embodiment of the holding device.

A holding device, designated in its entirety by reference numeral 50, is provided to hold the shaft 14 in the shaft seat 12 in its functional position (FIGS. 3 and 4). Due to the admission of measuring fluid, a force is exerted on the shaft 14 which has a tendency to move the shaft out of the shaft seat 12. The holding device 50 is used to hold the shaft 14 in its functional position in the shaft seat 12.

In a first embodiment which is schematically illustrated in FIG. 3, the holding device 50 includes a contact element 52, which rests against the shaft at its end 36 and thus blocks the shaft 14 from being displaced towards the contact element 52 as soon as the shaft 14 contacts it. Here, the contact element 52 is positioned in such a way that between the thrust plate 15 and an annular transverse surface 54, which bounds the second seat area 19, an annular gap 56 is formed as part of the bearing gap 18. The measuring fluid is then diverted transversely in its direction of flow which, in the part of the bearing gap 18 disposed within the first seat area 17, is essentially parallel to the longitudinal direction 16, in order to flow into the gap 56 between one end area of the thrust plate 15 facing the end 34 and the second seat area 19. At the outer end of the gap 56, the measuring fluid is again diverted in order to flow between an outer side of the thrust plate 15 and the shaft seat 12 towards the end 36, once again essentially parallel to the longitudinal direction 16.

Figure 5:
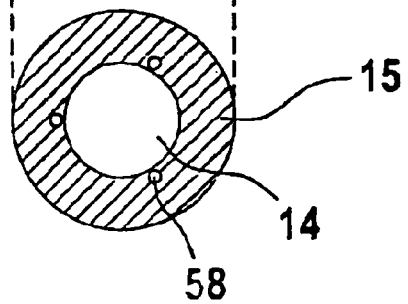
FIG. 5 is a cross-sectional view of the hydrodynamic test bearing according to FIG. 4.

A second embodiment of a holding device, which is schematically illustrated in FIGS. 4 and 5, is of particular use if the thrust plate 15 is provided with re-circulation holes 58 for lubricant. Such re-circulation hole 58 connects the bearing gap 18 with the recess 21 for the counter plate.

In accordance with this embodiment, the holding device 50 includes a force exerting device 60 by means of which the shaft 14 can be pressed onto the transverse surface 54 of the second seat area 19. The force exerting device 60 allows a force to be exerted in the direction opposite to the direction of through-flow of the measuring fluid through the bearing gap 18. For this purpose, for example, the force exerting device 60 includes an elastic element 62, such as a compression spring, so that the necessary force action can be provided.

After through-flowing through the bearing gap 18, the measuring fluid flows through the re-circulation holes 58 in the thrust plate 15.

Following is the description of the method of measuring and inspecting the bearing gap in accordance with the invention.

Gaseous measuring fluid such as air is admitted to the bearing gap 18 under a defined start pressure $p_0$ specified by the pressure reducer 22. Due to the flow resistance during the flow of fluid through the bearing gap 18, a pressure loss in relation to the start pressure is incurred so that a lower pressure $p_1$ appears in the feeding device 32, whereby the magnitude of the pressure difference $\Delta p = p_0 - p_1$ is characteristic for the mean hydraulic diameter of the bearing gap 18.

Thus, by determining the pressure difference $\Delta p$, the bearing gap 18 of the test bearing 10 can be measured, or the end-mounted hydrodynamic bearing itself can be characterized and classified.

The measurement to characterize the test bearing 10 is preferably only taken when quasi-stationary conditions prevail, this means that with a start pressure explicitly specified by the pressure reducer 22, the measurement is only taken when the pressure sensor 46 shows a stable value within the degree of measurement accuracy.

The conditions of fluid admission, that is the start parameters, are preferably selected in such a way that the through-flow of fluid through the bearing gap 18 from one end 34 in the direction towards the other end 36, does not result in a turbulent flow but rather result in a quasi-stationary, laminar flow. Therefore pressure losses are not caused by turbulence.

The device in accordance with the invention and the method in accordance with the invention allow a hydrodynamic bearing, even one with very narrow bearing gap widths in the order of magnitude of a few $\mu$m, to be characterized easily and quickly. In particular, test bearings in which the shaft 14 is placed in the shaft seat 12 in its functional position can be tested in this way.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A method of verifying a bearing gap between a shaft and a shaft seat of a hydrodynamic bearing, comprising the steps of:
    positioning the shaft into its functional position within the shaft seat of a test bearing;
    causing a measuring fluid to flow through the bearing gap by first attaching a hood of a feeding device to one end of the test bearing and then introducing the measuring fluid into the bearing gap through a feeding device such that said feeding device seals the bearing gap and a seal is positioned between an end face of the hood and the shaft seat; and
    measuring one or more parameters characterizing the through-flow of the fluid through the bearing gap.

2. The method according to claim 1, wherein the verification is performed before final assembly of the hydrodynamic bearing.

3. The method according to claim 1, wherein the verification is performed before a lubricant is introduced into the bearing gap.

4. The method according claim 1, wherein the measuring fluid is a gaseous measuring fluid.

5. The method according to claim 1, wherein the measuring fluid flows through the bearing gap in a flow direction which is substantially parallel to a longitudinal axis of the shaft.

6. The method according to claim 1, wherein the measuring fluid is introduced into the bearing gap in such a way as to result in a non-turbulent flow state of the measuring fluid.

7. The method according to claim 1, wherein the test bearing comprises an open end at each end of the shaft seat for the through-flow of fluid.

8. The method according to claim 7, wherein the measuring fluid flows through the test bearing from one open end.

9. The method according to claim 1, wherein the measuring fluid is introduced to the test bearing with a specific start pressure.

10. The method according to claim 9, further comprising a step of measuring the difference in pressure compared to the start pressure as a parameter characterizing the through-flow of fluid.

11. The method according to claim 9, further comprising a step of measuring the start pressure before introducing the measuring fluid into the test bearing.

12. The method according to claim 1, wherein the shaft is fixed in its functional position with respect to the direction of the through-flow.

13. The method according to claim 1, wherein a contact element is applied to the shaft preventing the movement of the shaft in the direction of through-flow.

14. The method according to claim 13, wherein a force is exerted on the shaft in the direction opposite to the through-flow direction, said force being greater than a lift force of the measuring fluid on the shaft.

15. The method according to claim 1, further comprising a step of classifying the test bearing in accordance with the measurement results verified in said measuring step.

16. The method according to claim 15, wherein said measurement results are determined after quasi-stationary conditions have been reached.

17. A device to verify a bearing gap between a shaft and a shaft seat of a test hydrodynamic bearing, said device comprising:

an admission device to introduce measuring fluid into the bearing gap of the test bearing; and a measuring device to measure at least one parameter characterizing the fluid through-flow through the bearing gap;

wherein the admission device comprises a feeding device through which the measuring fluid is introduced into the bearing gap at one end thereof, wherein said feeding device further comprises a hood said hood being configured to attach to one end of the test bearing; wherein said feeding device seals the bearing gap; and wherein a seal is positioned between an end face of the hood and the shaft seat.

18. The device according to claim 17, further comprising a pressure reducer defining a start pressure of the measuring fluid before said measuring fluid is introduced into the bearing gap.

19. The device according to claim 17, wherein the measuring device includes at least one pressure sensor.

20. The device according to claim 19, wherein at least one pressure sensor is arranged before the test bearing in relation to the direction of fluid flow.

21. The device according to claim 19, wherein at least one pressure sensor measures a pressure difference between a start pressure of measuring fluid introduced into said bearing gap and a resulting pressure of through-flow measuring fluid emerging from the bearing gap.

22. The device according to claim 17, further comprising a holding device positioning the shaft in its functional position in the shaft seat.

23. The device according to claim 22, wherein the holding device comprises a contact element preventing the movement of the shaft in the through-flow direction.

24. The device according to claim 22, wherein the holding device comprises a force exerting device exerting a force on the shaft in the direction opposite to the through-flow direction of the measuring fluid.

* * * * *

UNITED STATES PATENT AND TRADEMARK OFFICE
CERTIFICATE OF CORRECTION

PATENT NO. : 6,925,854 B2
APPLICATION NO. : 10/756675
DATED : August 9, 2005
INVENTOR(S) : Rudolf Neumann It is certified that error appears in the above-identified patent and that said Letters Patent is hereby corrected as shown below:

On the cover page, item (73) should be changed from "Minebea Co., Inc." to --Minebea Co., Ltd.--.

Signed and Sealed this

Twenty-second Day of May, 2007

JON W. DUDAS
*Director of the United States Patent and Trademark Office*